(12) United States Patent  (10) Patent No.: US 7,717,245 B2
Pollman  (45) Date of Patent: May 18, 2010

(54) SELF-ACTUATING CLUTCH

(75) Inventor: Frederic W. Pollman, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 547 days.

(21) Appl. No.: 11/668,082

(22) Filed: Jan. 29, 2007

(65) Prior Publication Data

US 2008/0179159 A1 Jul. 31, 2008

(51) Int. Cl.
*F16D 13/28* (2006.01)

(52) U.S. Cl. .................. 192/48.91; 192/66.22

(58) Field of Classification Search ........... 192/66.2, 192/66.21, 66.22, 53.361, 48.91; 403/359.2, 403/359.3, 359.4
See application file for complete search history.

(56) References Cited

U.S. PATENT DOCUMENTS

| | | | |
|---|---|---|---|
| 2,205,794 A * | 6/1940 | Jandasek | 60/342 |
| 2,346,606 A | 4/1944 | Putt | |
| 2,410,511 A * | 11/1946 | Letsinger et al. | 192/53.31 |
| 2,521,730 A * | 9/1950 | Keese | 192/53.361 |
| 2,846,038 A * | 8/1958 | Brownyer | 192/48.91 |
| 2,900,059 A * | 8/1959 | Zittrell et al. | 192/53.361 |
| 3,463,033 A | 8/1969 | Fisher | |
| 3,831,463 A | 8/1974 | Ahlen | |
| 3,880,017 A | 4/1975 | Miyao et al. | |
| 3,893,551 A | 7/1975 | Ahlen | |
| 3,964,347 A | 6/1976 | Ahlen | |
| 4,545,469 A | 10/1985 | Yogome et al. | |
| 4,641,549 A | 2/1987 | Muller | |
| 5,071,391 A | 12/1991 | Kita | |
| 5,683,322 A | 11/1997 | Meyerle | |
| 5,766,107 A * | 6/1998 | Englisch | 475/80 |
| 5,890,982 A | 4/1999 | Meyerle | |
| 6,092,432 A | 7/2000 | Klaricic | |
| 6,739,443 B2 * | 5/2004 | Fernandez | 192/53.341 |
| 2004/0154892 A1 * | 8/2004 | Coxon et al. | 192/53.31 |

* cited by examiner

*Primary Examiner*—Rodney H Bonck
*Assistant Examiner*—Erin D Bishop

(57) ABSTRACT

A hydromechanical transmission having a self actuating clutch assembly. The self-actuating clutch assembly comprises a first and second gear clutching elements and a shaft clutching element that engages a shaft. The shaft clutching element is a cone clutch that is actuated by a ball element that is biased towards the shaft clutching element by a spring element that is disposed through the shaft.

15 Claims, 5 Drawing Sheets

SELF-ACTUATING CLUTCH

BACKGROUND OF THE INVENTION

This invention relates to a hydrostatic transmission. More specifically, this invention relates to a self-actuating clutch assembly within a hydrostatic transmission that improves clutching efficiency.

There are a number of vehicles that have automatic transmissions for ease of driving in increased utility. These include ATVs, tractors and utility work vehicles. These vehicles have common requirements for low cost, high efficiency, good control ability, and continuous ratio change throughout the entire speed range. Hydromechanical transmissions have utility in these vehicles because they meet these needs and can be designed with compact size.

Hydromechanical transmissions are characterized by a hydrostatic transmission power path in parallel with a mechanical power path that is arranged in a manner to decrease the average power flow from the hydrostatic portion and thereby increase operating efficiency. The existence of the parallel power path creates the possibility of reducing the output speed range or torque ratio in order to further reduce transmitted hydrostatic power. This requires multiple ranges or "modes" to achieve the full torque and speed range of the transmission.

Multi mode hydromechanical transmissions (HMTs) are usually accomplished by reusing the hydrostatic components and clutching to a different mechanical component. Usually the gearing is arranged so that there is no ratio change during the mode change, or clutching process, in order to have continuous speed and torque delivery. During a mode change, one clutch is exchanged for another at a near synchronous speed. The clutch differential speed is ideally pre-synchronous in order to have the fastest and smoothest shifts.

Previously, two or three mode hydromechanical transmissions have been provided that use mechanical dog clutches having mating slots and tangs. These dog clutches are low cost and compact and are actuated with a simple, low force mechanical system. However, there are some operating conditions where engaging the clutches under dynamic conditions is a problem as dog clutches will not allow any slipping during engagement. Other solutions provide two or three mode hydromechanical transmissions with several coaxial clutches which are in a multiple disc configuration. Multiple disc clutches are usually designed to allow some slippage during engagement thereby easing the synchronizing process but adding cost and size to the transmission. Multiple disk clutches require a high actuating force, a complex actuating system and normally require oil flow to cool the discs and reduce disc flutter.

Thus, it is the primary object of the present invention to provide a hydromechanical transmission that provides a cost effective clutching mechanism.

Yet another object of the present invention is to provide a hydromechanical transmission that provides a more efficient clutching mechanism.

Another object of the present invention is to provide a clutch mechanism that allows slippage during engagement to improve the operation of a hydromechanical transmission.

These and other objects, features, or advantages of the present invention will become apparent from the specification and claims.

BRIEF SUMMARY OF THE INVENTION

A hydromechanical transmission having a hydraulic pump and motor that are fluidly connected. The hydromechanical transmission additionally has a plurality of gears and first and second gear clutching elements that when actuated, place the hydromechanical transmission in different operating modes. The hydromechanical transmission additionally has a shaft that has a shaft clutching element therein that selectively engages the first and second gear clutching elements. The shaft clutching element comprises a cone clutch that is activated by a ball element that engages a spring element that is disposed through a passageway within the shaft.

DETAILED DESCRIPTION OF THE PREFERRED EMBODIMENT

Figure 1:
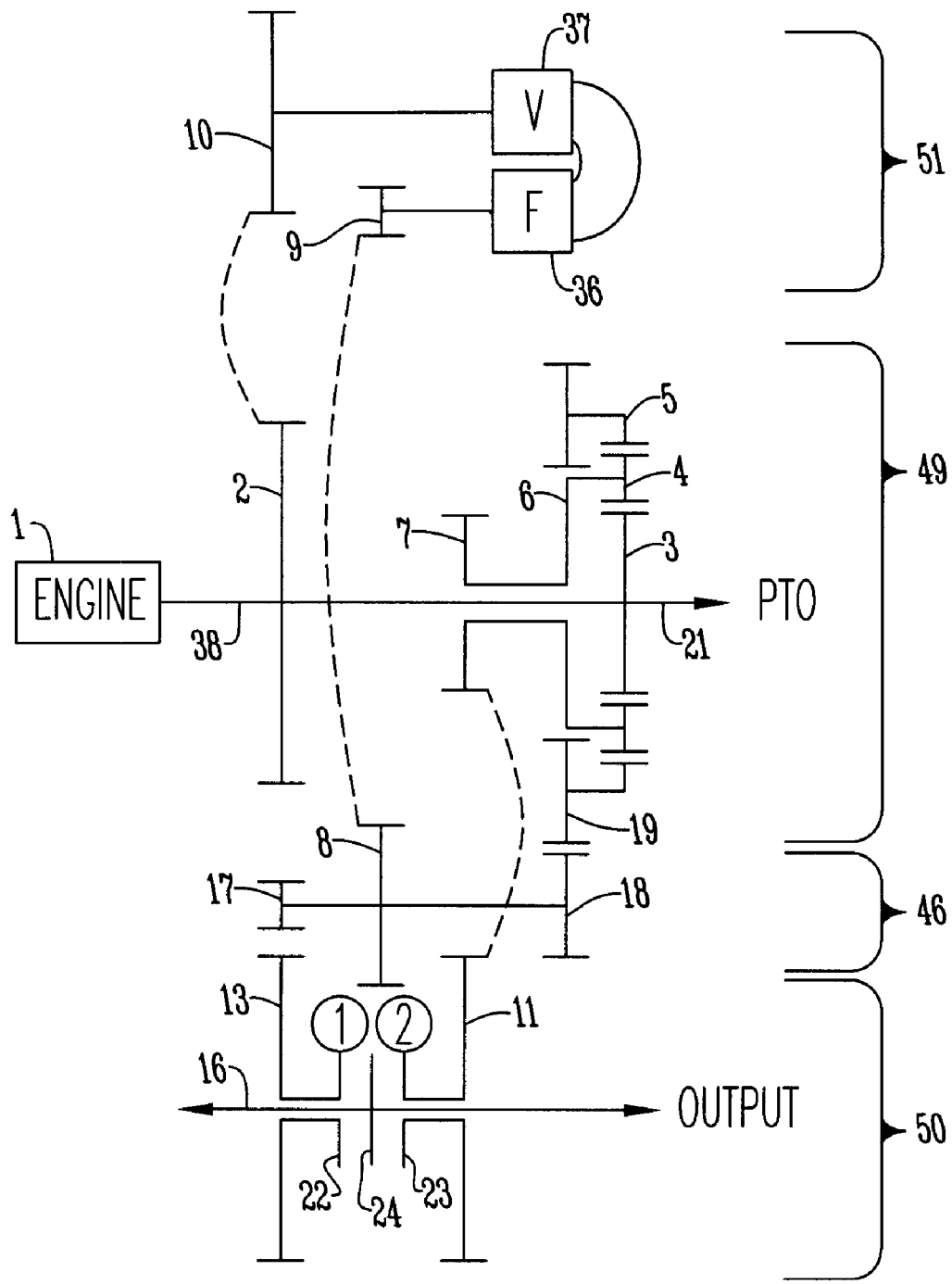
FIG. 1 is a schematic view showing the components of the invention.

Primary component groups are the hydrostatic transmission 51, idler shaft 46, input/planetary 49 and the output assembly 50. In the start-up mode, which is hydrostatic, power from engine 1 travels through shaft 38 to gear set 2/10 into the hydrostatic transmission 51. The V-unit 37 starts at zero stroke and no power is transmitted. As the operator and programmed logic commands, a controller strokes a swashplate of V-unit 37. As V-unit 37 is stroked to positive displacement, flow is sent to F-unit 36 and rotation of gear set 9/8 starts. Power is delivered to idler shaft 46 and to gear set 17/13. Clutch 1 is connected and power flows to output shaft 16. As V-unit 37 is stroked fully, output 16 reaches the maximum forward speed for mode 1. Planetary 49 is inactive in mode 1. The stroke control logic for the V-unit 37 that resides in the controller may be of any type and may be like that described in U.S. Pat. No. 5,560,203.

At the fully stroked position of V-unit 37, all elements of output shaft 16 are at the same nominal speed. A mode change is initiated and clutch 1 and 2 are shifted. When clutch 2 is engaged and power is delivered to output shaft 16 through gear set 7/11. Note that power is now being delivered to planetary 49 through gear set 18/19 to ring 5, and through shaft 38 to sun 3, creating parallel power paths. Power is transmitted from both paths to planets 4 to carrier 6, to gear set 7/11 and to output 50. Because ring 5 is speed controlled by HST 51, a variable speed is controlled at output 50. The controller strokes V-unit 37 from full positive to full negative displacement and output speed delivered through gear set 7/11 to shaft 16 reaches maximum for mode 2. Though FIG. 1 only shows two operating modes, additional operating modes are contemplated within the scope of this invention.

Figure 2:
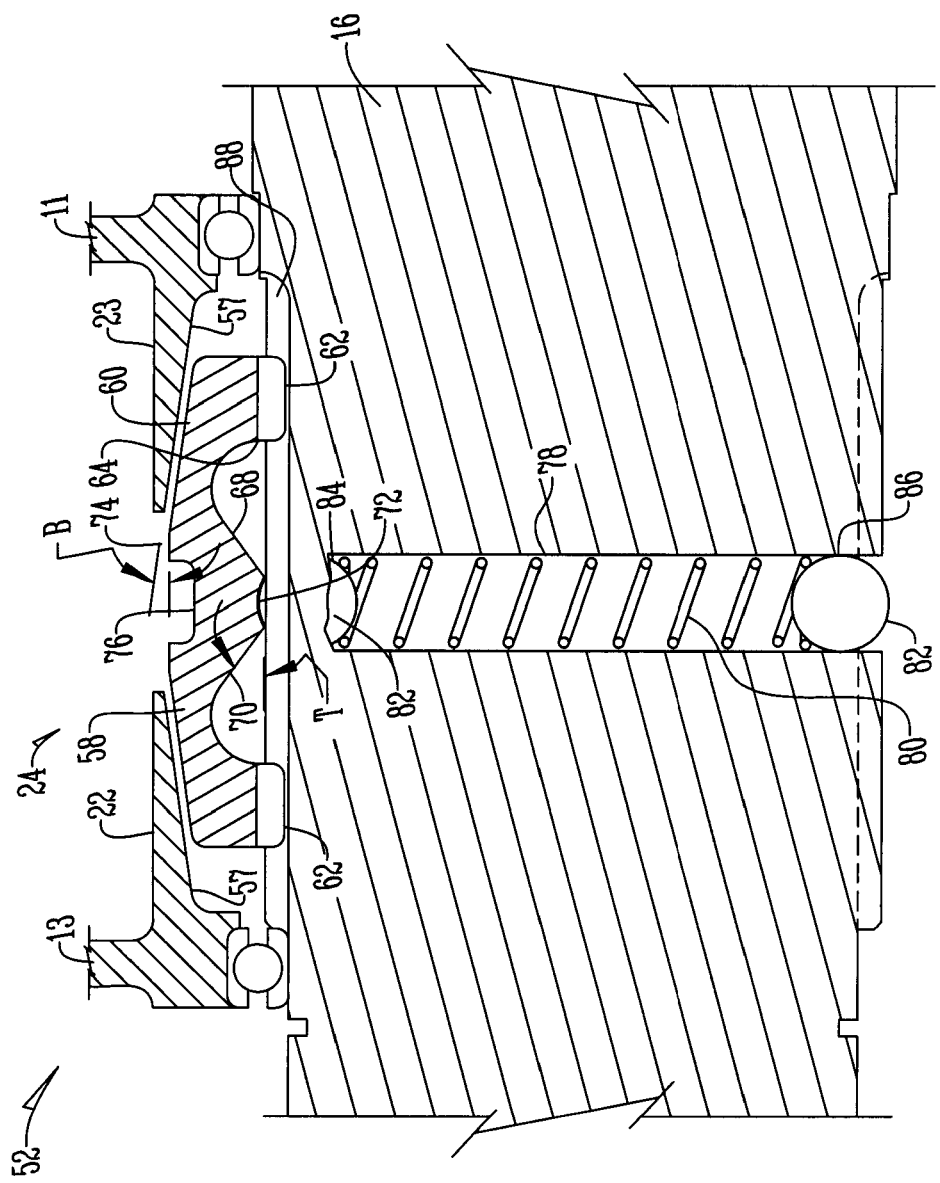
FIG. 2 is a sectional view of the shaft clutching element.

FIG. 2 shows a self-actuating clutch assembly 52 that comprises a shaft clutching element 24 that engages a first gear clutching element 22 of gear 13 or a second gear clutching element 23 of gear 11 at an angled surface 57 on the clutching elements 54, 56. In a preferred embodiment the self-actuating clutch assembly comprises a cone clutching element. The shaft clutching element 24 has first and second cone halves 58, 60 with each half 58, 60 having an internal spline with teeth elements 62 on an interior surface 64 that engage the shaft 16 to hold the first and second cone halves 58, 60 to the shaft 16. The interior surface 64 of the shaft clutching element 24 has first and second transfer cones 68, 70 and a centrally located annulus or detent 72. The exterior surface 74 of the shaft clutching element 24 angles downwardly at an angle from a centrally located annulus or detent 76 that corresponds with the angled surface 57 of the first and second gear clutching elements 22, 23.

The shaft 16 has a passageway 78 that has a spring element 80 disposed therethrough that engages ball elements 82 at first and second ends 84, 86 respectively. Additionally, the shaft 16 has external teeth 88 (FIG. 3) that mate with the internal spline and specifically, the teeth 62 of the shaft clutching element 24. Thus, shaft clutching element 24 may slide axially on shaft 16 in order to engage the first and second cone halves 58 or 60 forming a driving connection between shaft 16 and either gear 13 or 11.

The ball elements or detent balls 82 are located radially opposite each other and are loaded with the spring element 80 that is positioned within the passageway 78. Passageway 78 is positioned to be directly in line with radially opposite pairs of teeth 88A (FIG. 3) of shaft 16 so as to provide an axial stop for the detent balls 82. Teeth 88 are sized such that detent ball 82 is circumferentially contained near the maximum diameter of the ball element 82 by adjacent tooth faces 88B and 88C.

As shown in FIG. 2 when a detent ball 82 rests within the annulus 72 of the interior surface 64 of the shaft clutching element 24, the clutch assembly 52 is considered in a neutral or center position wherein the first and second cone halves 58, 60 do not engage the first and second gear clutching elements 54 or 56. Thus, circumferential groove or centrally located annulus 76 is provided for the purpose of moving the shaft clutching element 24 out of this neutral position. The groove 76 is mated to a conventional fork which is moved axially by a number of means including a hydraulic cylinder and valve or a set of solenoids, or a rotary cam.

When shaft clutching element 24 is moved axially to the left by actuation of the groove or annulus 76, out of the neutral position, the ball element 82 moves away from the annulus 72 on the interior surface 64 of the shaft clutching element 24. The detent balls 82 then act on transfer cone 68 to force element 24 further to the left. In this way the clutch is self activating. The force created by the spring element 80 on balls 82 thus acts through cone angle T. Cone angle T is configured to provide the correct mechanical advantage between spring element 80 and shaft clutching element 24 and in a preferred embodiment is between 20 degrees and 60 degrees. Thus, clutch element 24 is forced by spring element 80 to engage the gear clutching element 54 to form a driving connection between the shaft 16 and gear 13. This is position 1 that activates clutch 1 as shown in FIG. 1. No external force is applied through the annulus 76 to keep the clutch engaged. Because no external force is applied the clutch assembly 52 is self actuating.

Clutch 1 is disengaged by moving groove 76 to the right and returning the shaft clutching element 24 to the neutral position. Clutch position 2 is obtained by moving the groove 76 further to the right causing the ball elements 82 to engage transfer cone 70. This causes the shaft clutching element 24 to engage the gear clutching element 56 in a similar manner as described above.

The angled surface 57 of the first and second gear clutching elements 54, 56 and the angled exterior surface 74 have matching cone angles B. Cone angle B is selected to minimize the required actuating force delivered by spring element 80 through cone angle T on shaft clutching element 24. Cone angle B is near to self locking and in a preferred embodiment is in a range of 4 degrees to 7 degrees.

The spline teeth 62, 88 prevent rotational displacement of shaft clutching element 24 and shaft 16. Alternate configurations may be utilized that increase the clutch torque capacity. These include additional cones and/or additional springs and detent balls.

When used in a hydromechanical transmission to change modes, the shift point is sensed by the displacement of the unit 37 or by other suitable means. A shift is initiated by a controller and a lower powered device moves the fork and groove or annulus 76 to slide shaft clutching element 24 on shaft 16. This engages one clutch and may disengage the other. If the shift is made, non-synchronously, the clutch accepts the slipping until the clutch is fully actuated. The initial shift movement is accomplished with a simple mechanism and the clutch element stays engaged without any external force being applied. The limited energy capacity of the cone clutches is not an issue in a hydromechanical transmission as only the speed of the low inertia F unit is being changed and only by a small amount.

Figure 3:
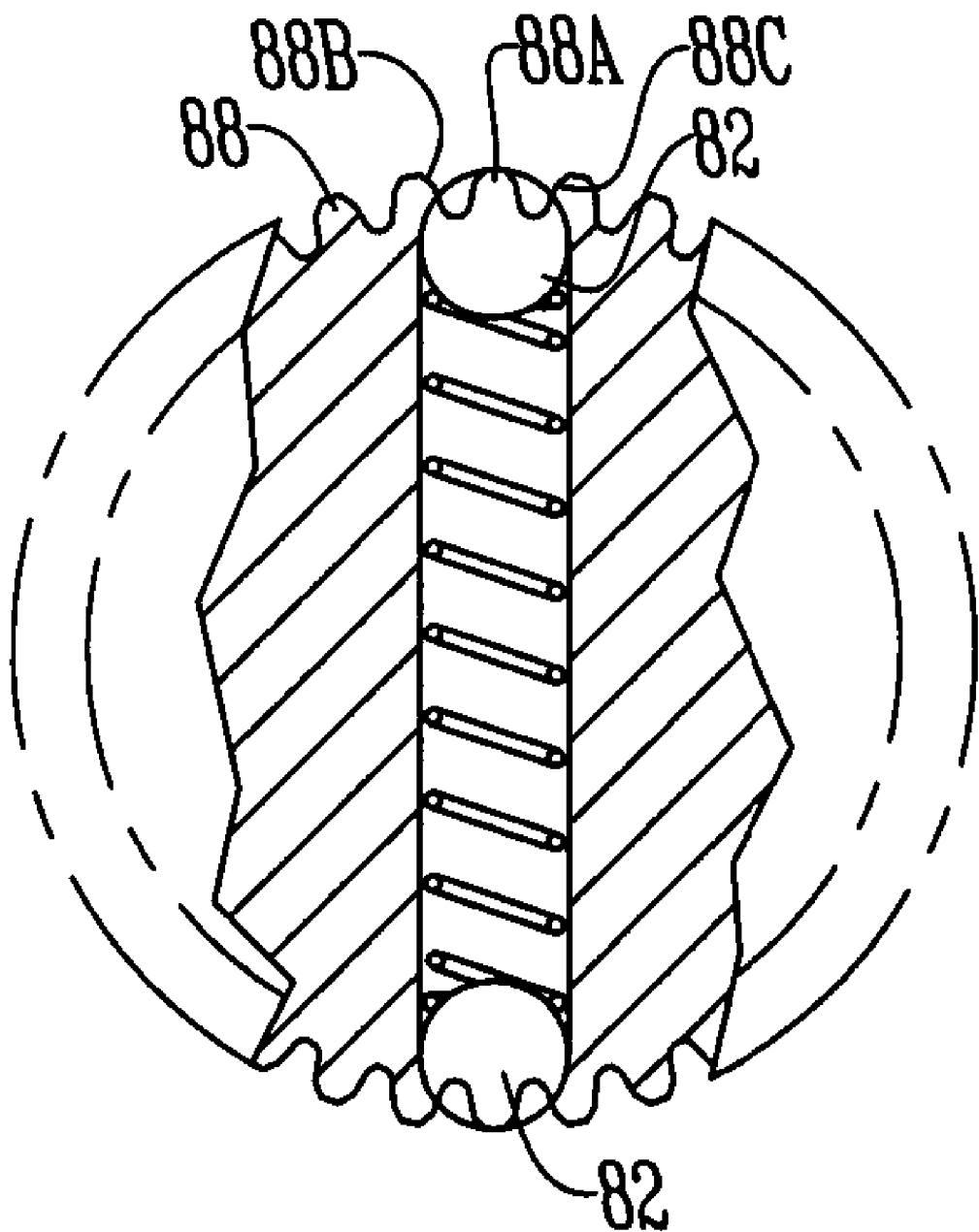
FIG. 3 is a sectional view of the output shaft.
Figure 4:
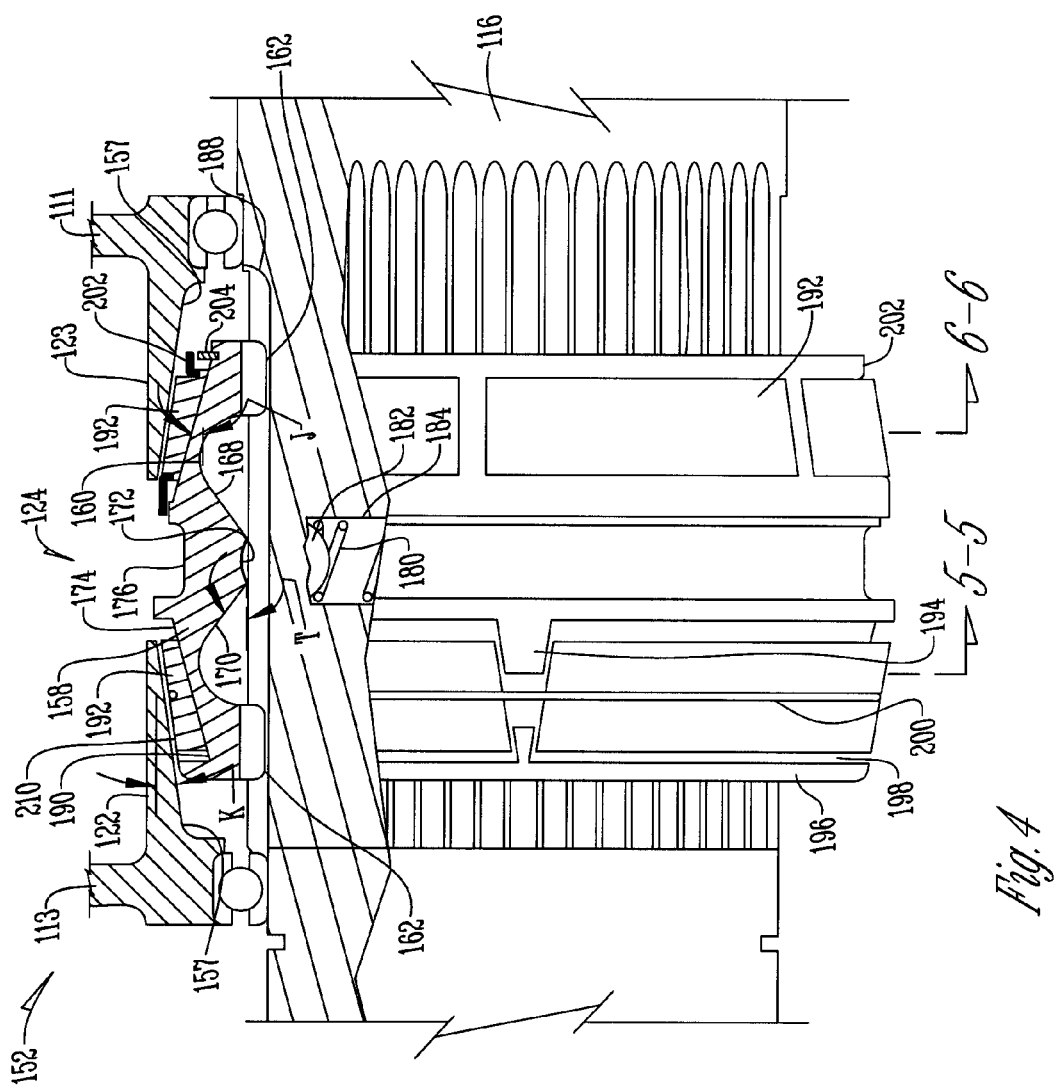
FIG. 4 is a sectional cutaway view of a shaft clutching element.
Figure 5:
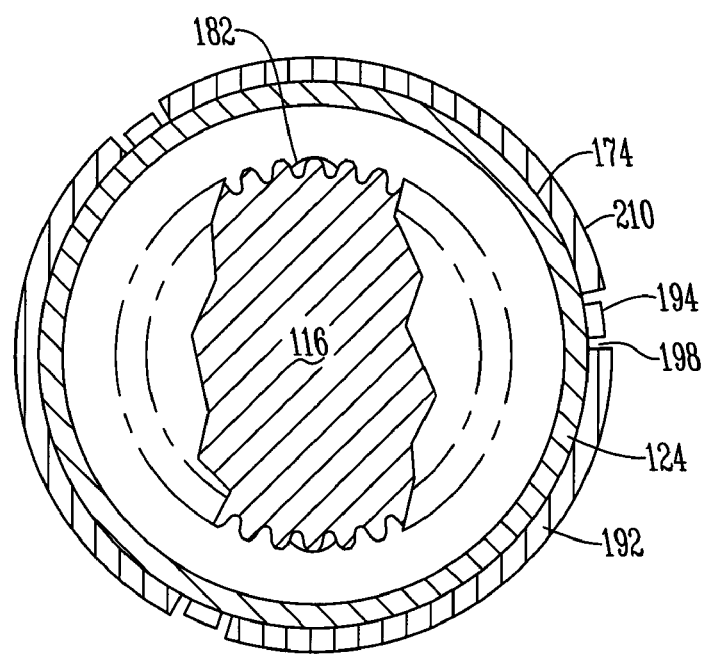
FIG. 5 is a sectional view of a wedge of a shaft clutching element shown in FIG. 4.
Figure 6:
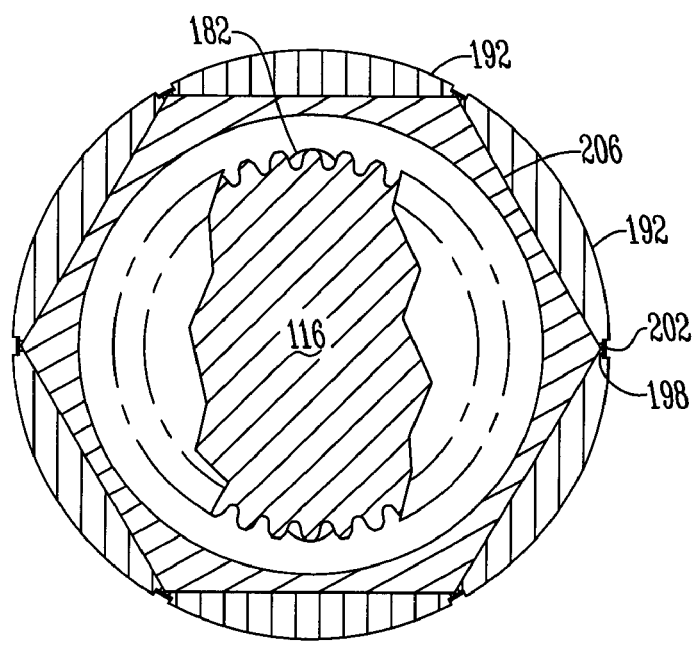
FIG. 6 is a sectional view of a wedge of a shaft clutching element shown in FIG. 4.

FIGS. 4, 5 and 6 refer to a two stage self-actuating clutch assembly 152. For convenience, similar elements of the self-actuating clutch shown in FIGS. 2 and 3 are numbered by adding 100 to the number. In this embodiment the exterior surface 174 of the shaft clutching element 124 has an angled cavity 190 that receive wedges 192 that have internal and external angles with the apex on the same side. External angle K is smaller than internal angle J. Angle K forms a cone on the exterior surface 210 of the wedges and in a preferred embodiment is a range of 1 degree to 8 degrees. The angled surface 157 is designed to match the angle K formed on the exterior surface 210 by the wedges 192. Taper angle J is not a uniform cone and is illustrated with two different shapes, either of which may be used. In a preferred embodiment tapered angle J is in a range of 6 degrees to 15 degrees.

Wedges 192 are shown in three segments and have a minimum of two segments. Wedges 192 have an internal conical surface that mates with a partially conical surface on shaft clutching element 124. Shaft clutching element 124 is provided with circumferential stops 194 which prevent spinning of the segmented wedges 192 on the shaft clutching element 124. Stops 194 and wedges 192 in a preferred embodiment have tapered sides to facilitate this disengagement of the clutch. Additionally, a second stop element 196 contains the segmented wedges 192 axially. Radial and axial clearance 198 is provided all around segmented wedges 192 and stops 194 and 196.

In a preferred embodiment the wedges 192 may be constrained radially by a wire spring clip 200 to resist centrifugal force. Alternatively, wedges 192 may be inserted in a circular cage 202 for high speed application, wherein the second stop 198 would be removable.

In this embodiment, when the annulus or groove 176 is moved left, the spring element 180 applies an axial force to the shaft clutching element 124 through ball element 182 and transfer cone 168. Wedge 192 contacts the mating surface of shaft clutching element 124 and the angled gear clutching surface 157 of clutching element 122. The clutch engages and reduces any differential speed to zero and shaft 116 thus drives gear 113. As internal angle J is greater than external angle K, the torque developed in the inside of wedge 192 is less than on the outside. However, stops 194 prevent the wedge segments 192 from spinning on element 124. To disengage, element 124 is moved right by the annulus or groove 176. Tapered angle J is sized to be non self locking. Any movement to the right of shaft clutching element 124 takes away the support of wedge segment 192 and the wedge segment 192 also moves right. Cone angle K in a preferred embodiment is made as small as desired, thereby increasing the torque capacity of the clutch at spring element 180 load without experiencing self locking.

FIG. 6 shows an embodiment wherein wedges 192 have six segments though they may have a minimum of three segments. In this configuration the external surface 206 of shaft clutching element 124 that is adjacent to wedges 192 is a tapered sided polyhedron with the same number of sides as there are segments. The tapered angle J matches the inner surface of wedge segment 192. Removable stop 204 constrains wedge 192 axially. Radial and axial clearance 198 is provided all around the segments of wedge 192. In this embodiment the wedge 192 is constrained by a wire clip or circular cage 202.

In this embodiment if the groove or annulus 176 is moved to the right spring 180 applies an axial force to shaft clutching element 124 through ball element 182 and transfer cone 170. Wedge 192 contacts the polyhedral surface 206 of shaft clutching element 124 and angled surface 157 of the second gear clutching element 123. The clutch engages and reduces any differential speed to zero. Shaft 116 thus drives gear 111 while the polyhedral surface 206 prevents the wedge segments 192 from spinning on element 124. Additionally, the cam action of surface 206 increases the load between the shaft clutching element 124 and the gear clutching element 123 as shaft torque increases, thereby increasing the torque capacity of the clutch.

To disengage, shaft clutching element 124 is moved left by the annulus or groove 176. Angle J is sized to be non self locking. Any left movement of shaft clutching element 124 takes away the support of wedge segments 192 and they also move left. Cone angle K, in a preferred embodiment, is made as small as desired thereby increasing the torque capacity of the clutch at spring element 180 load while not experiencing self locking.

Though the surface 206 of wedge 192 and shaft clutching element 124 are shown flat, they may be concave or convex in the transverse view. If surface 206 of shaft clutching element 124 were convex, the radius origin would not coincide with the center line of shaft 116. Changing the transverse contour of surface 206 changes the cam action of the wedges 192 and the resulting torque capacity of the clutch.

Thus, an improved hydromechanical transmission is provided. Specifically, a cost efficient and mechanically efficient self actuating clutching assembly is provided that improves upon the state of the art. Thus, at the very least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A transmission comprising:
   a gear clutching element;
   a shaft having a shaft clutching element detachably engaged to the gear clutching element;
   wherein the shaft clutching element comprises a cone clutch actuated by a ball element that engages a spring element disposed through a passageway in the shaft;
   wherein the ball element acts upon a transfer cone to self actuate the clutch; and wherein the cone clutch comprises first and second cone halves each half with teeth elements on an interior surface engaging the shaft.

2. The transmission of claim 1 wherein said interior surface of the shaft clutching element has an annulus for receiving the ball element to define a neutral position.

3. The transmission of claim 2 wherein when actuated the ball element moves from the annulus to define a first clutched position such that an exterior surface of the shaft clutching element engages the gear clutching element.

4. The transmission of claim 3 wherein the exterior surface has a centrally located actuating groove.

5. The transmission of claim 2 wherein each cone half has an angled cavity that receive wedges that are adjacent and spaced apart from the gear clutching element when the shaft clutching element is in the neutral position.

6. The transmission of claim 5 wherein a removable stop constrains the wedges axially.

7. The transmission of claim 5 wherein a wire spring clip constrains the wedges radially to resist centrifugal force.

8. The transmission of claim 5 wherein the shaft clutching element has at least one circumferential stop to resist movement of the shaft clutching element.

9. The transmission of claim 5 wherein the wedges have a plurality of segments.

10. The transmission of claim 9 wherein an external surface of the shaft clutching element is adjacent to the wedges and is a tapered sided polyhedron with the same number of sides as there are segments.

11. The transmission of claim 1 wherein the ball element is contained axially by a spline tooth of the shaft.

12. A self actuating clutch assembly comprising:
    a shaft having a passageway disposed therein;
    a spring element disposed through the shaft passageway with a ball element at a first end;
    a shaft clutching element having first and second cone halves each half with teeth elements on an interior surface engaging the shaft;
    said interior surface of the shaft clutching element has first and second transfer cones and a centrally located annulus for receiving the ball element to define a neutral position;
    wherein when actuated the ball element moves from the annulus to a first transfer cone to define a first clutched position such that an exterior surface of the shaft clutching element engages a first gear clutching element; and
    wherein the ball element acts upon the transfer cone to self actuate the clutch.

13. The self actuating clutch of claim 12 wherein the exterior surface has a centrally located actuating groove.

14. The self actuating clutch assembly of claim 12 wherein the shaft clutching element is a cone clutch.

15. A hydromechanical transmission comprising:
    a hydraulic pump fluidly connected to a hydraulic motor;
    a plurality of gears rotatably connected to the hydraulic pump and hydraulic motor; and
    a self actuating clutch assembly having a first gear clutching element associated with a first gear of the plurality of gears and an output shaft having a shaft clutching element that when actuated engages the first gear clutching element; and
    wherein the shaft clutching element comprises a cone clutch actuated by a ball element that engages a spring element disposed through a passageway in the output shaft;
    wherein the ball element acts upon a transfer cone to self actuate the clutch; and wherein the cone clutch comprises first and second cone halves each half with teeth elements on an interior surface engaging the shaft.

* * * * *